United States Patent [19]
Tani et al.

[11] Patent Number: 5,449,292
[45] Date of Patent: Sep. 12, 1995

[54] TACTILE READING DEVICE

[75] Inventors: Yoshiyuki Tani; Yukio Shiraishi; Hong R. Su; Akiyoshi Morita; Kunihiro Suzuki, all of Urayasu, Japan

[73] Assignee: KGS Corporation, Chiba, Japan

[21] Appl. No.: 157,397

[22] Filed: Nov. 23, 1993

[30] Foreign Application Priority Data

Apr. 16, 1993 [JP] Japan .................. 5-089907

[51] Int. Cl.⁶ .............................. G09B 21/00
[52] U.S. Cl. .................. 434/114; 434/113; 340/825.19; 400/124.14
[58] Field of Search .................. 434/112–115, 434/117, 258; 400/124.14; 601/84; 340/825.19; 341/21

[56] References Cited

U.S. PATENT DOCUMENTS

| | | | |
|---|---|---|---|
| 4,191,945 | 3/1980 | Hannen et al. | 434/114 X |
| 4,664,632 | 5/1987 | Tretlakoff et al. | |
| 4,898,536 | 2/1990 | Hoffarth | 434/114 |
| 5,165,897 | 11/1992 | Johnson | 434/113 |
| 5,226,817 | 7/1993 | Nakajima et al. | 434/114 X |

FOREIGN PATENT DOCUMENTS

| | | | |
|---|---|---|---|
| 3035852 | 5/1982 | Germany | 434/113 |
| 3923967C2 | 6/1991 | Germany | |
| 62-164380 | 10/1987 | Japan | |
| 9215079 | 9/1992 | WIPO | 434/113 |

Primary Examiner—Joe H. Cheng
Attorney, Agent, or Firm—Frishauf, Holtz, Goodman, Langer & Chick

[57] ABSTRACT

This invention discloses a tactile reading device including sensing rods that are supported to be vertically movable, piezo-electric actuating elements disposed in the vertical direction such that their free end portions are directed upward, and pushing-up cams having first levers which are axially and pivotally supported on support rods provided at an upper position of the free end portions of the piezo-electric actuating elements, extending downward from the support rods, and having side surfaces at distal end portions thereof which are freely abutted against the free end portions of the piezo-electric actuating elements, and second levers extending horizontally from the support rods and freely mounting, on their mounting planes, lower end portions of the sensing rods corresponding to the piezo-electric actuating elements.

9 Claims, 11 Drawing Sheets

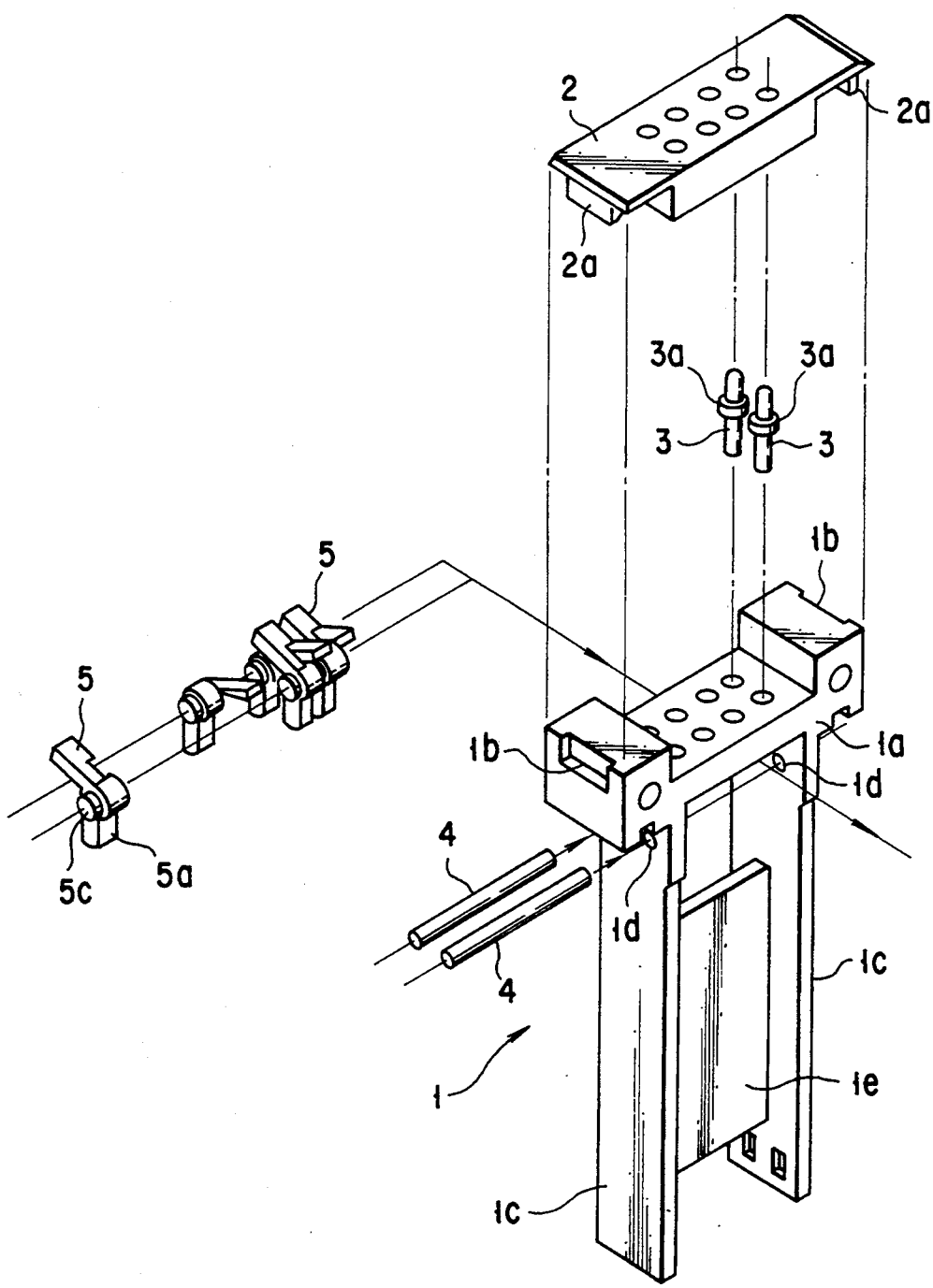
F I G. 1

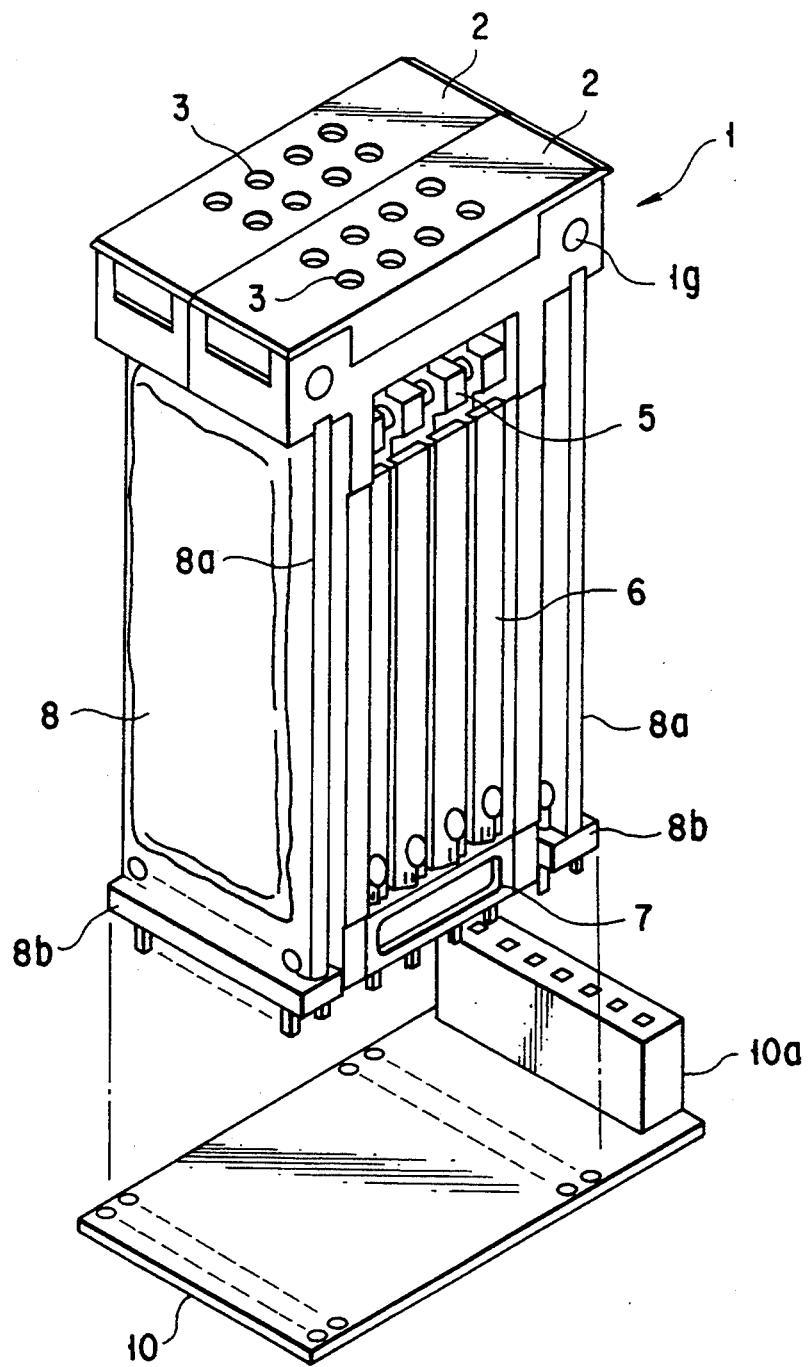
F I G. 3

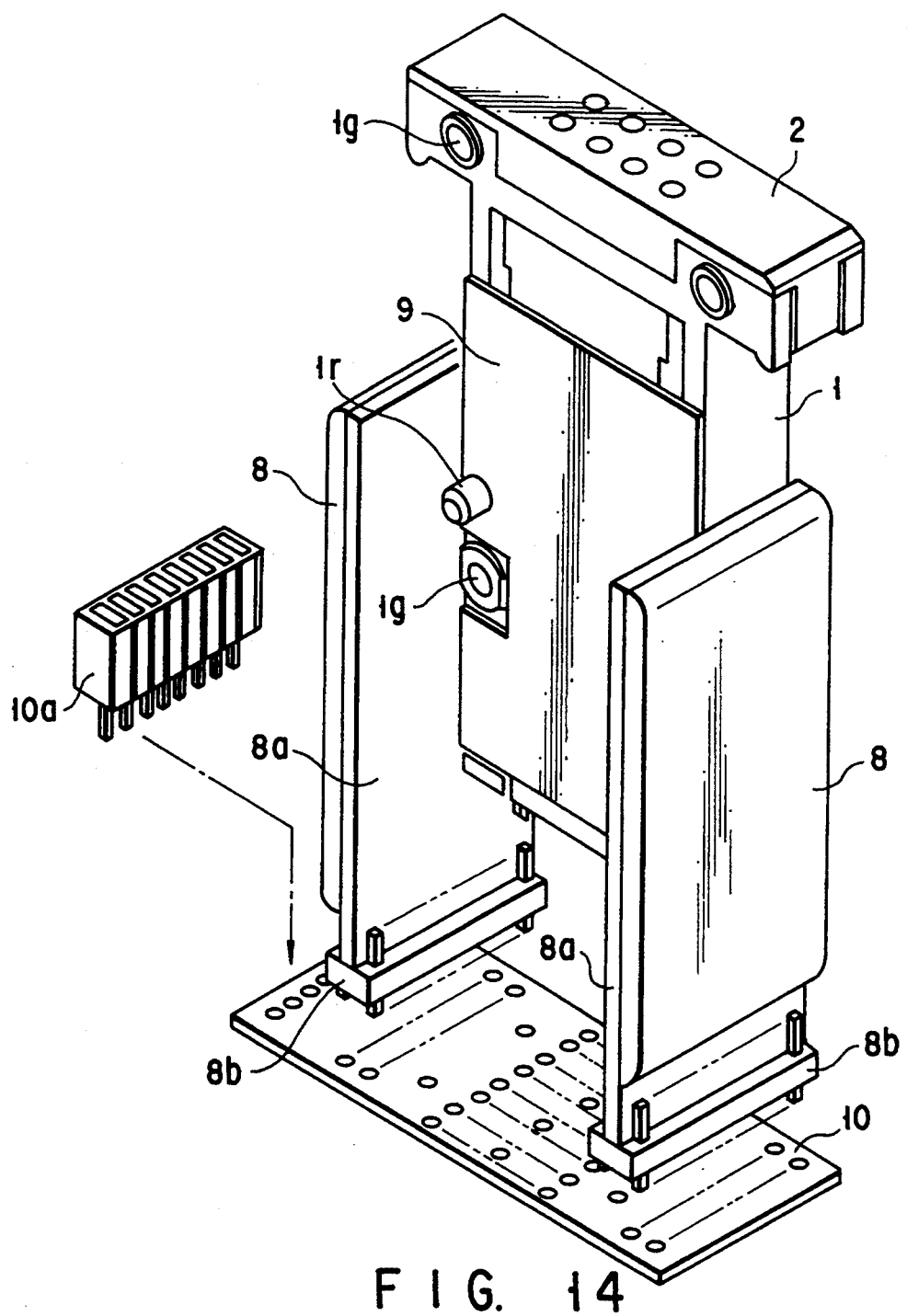
F I G. 14

TACTILE READING DEVICE

BACKGROUND OF THE INVENTION

1. Field of the Invention

The present invention relates to a tactile reading device using a bimorph piezo-electric actuating element as an actuating source.

2. Description of the Related Art

As disclosed in, e.g., Jpn. UM Appln. KOKAI Publication No. 62-164380, in a conventional braille type cell, a plurality of bimorph piezo-electric actuating elements corresponding to a number of sensing rods constituting a braille type unit of display are provided in the horizontal direction in a required number of steps, with the sensing rods being mounted on the free end portions of the piezo-electric actuating elements. When a required piezo-electric actuating element is selectively driven, the corresponding sensing rod is vertically moved by the vertical displacement of the free end portion of this piezo-electric actuating element, so that the distal end portion of the sensing rod projects from a finger touch scanning portion, thereby displaying braille type information.

In this conventional tactile reading device, since the piezo-electric actuating elements are arranged in the horizontal direction, a large horizontal space is required. In addition, since the sensing rods move in the vertical direction, the space must also be large in the vertical direction, making it difficult to downsize a braille type cell module constituted by necessary constituent elements including the piezo-electric actuating elements and the sensing rods. In order to display character information occupying a large number of lines or graphic information, sensing rods must be provided at a high density on a necessary sensing surface. However, in the conventional tactile reading device in which the piezo-electric actuating elements are arranged in the horizontal direction, it is difficult to display such information due to structural problems.

In order to solve these problems, there is provided a braille type cell in which piezo-electric actuating elements are arranged in the vertical direction, sensing rods which are driven in the vertical direction are provided above the piezo-electric actuating elements, the sensing rods being driven through a means for converting the horizontal movement of the free end portions of the piezo-electric actuating elements to a vertical movement. As a result, character information occupying a large number of lines and graphic information, to a certain degree, can be displayed.

However, a strong demand has arisen for further down-sizing of a braille type system and for fine graphic information display.

SUMMARY OF THE INVENTION

The present invention has been made to eliminate the drawbacks of the conventional tactile reading device described above. It is an object of the present invention to provide a tactile reading device which is further downsized by employing a means for converting the horizontal movement of the free end portions of piezo-electric actuating elements to a vertical movement and by improving the efficiency of mounting constituent components, and which can display character information, occupying a large number of lines, and graphic information at once.

According to the present invention, there is provided a tactile reading device having a plurality of sensing rods serving as a braille type display unit, piezo-electric actuating elements provided to respectively correspond to the sensing rods, and a frame body for mounting thereon module constituent components including the sensing rods and the piezo-electric actuating elements, for displacing the free end portion of a piezo-electric actuating element corresponding to a selected sensing rod in order to push up this sensing rod from a reset position to a set position, thereby providing required braille type information, comprising the sensing rods provided on the upper portion of the frame body and supported so as to be vertically movable, the piezo-electric actuating elements provided on the lower portion of the frame body and disposed vertically such that free end portions thereof oppose upward, and pushing-up cams having first levers which are axially and pivotally supported on support rods provided above the free end portions of the piezo-electric actuating elements, extending downward from the support rods, and having side surfaces at distal end portions thereof which are freely abutted against the free end portions of the piezo-electric actuating elements, and second levers extending laterally from the support rods and freely mounting, on mounting planes at distal end portions thereof, lower end portions of the sensing rods corresponding to the piezo-electric actuating elements.

The mounting plane of the second lever of each pushing-up cam for mounting the corresponding sensing rod thereon forms a predetermined angle or a predetermined curved surface with respect to a horizontal direction.

Portions of the first levers of the pushing-up cams which are abutted against the free end portions of the piezo-electric actuating elements may be provided with projections.

The pushing-up cams are imparted with a rotational moment so that the side surfaces at the distal end portions of the first levers are always abutted against the free end portions of the piezo-electric actuating elements by a difference in rotational moment between the first and second levers with respect to the support rods.

The piezo-electric actuating elements corresponding to the sensing rods on one side, belonging to the adjacent sensing rods on two sides that oppose each other in a direction so as to displace the free end portions of the piezo-electric actuating elements, may be disposed below the sensing rods on the other side, and piezo-electric actuating elements corresponding to the sensing rods on the other side may be disposed below the sensing rods on one side.

A cassette that integrally houses a predetermined number of pushing-up cams and the support rods supporting the pushing-up cams may be detachably mounted on the frame body.

The tactile reading device according to the present invention may have a housing for integrally holding a predetermined number of piezo-electric actuating elements. Electrodes on the front and rear surfaces of the proximal end portions of these piezo-electric actuating elements may be directly connected to the lead terminals provided to the housing. The housing may be detachably mounted on the frame body.

In the tactile reading device according to the present invention, control drive circuits for the piezo-electric actuating elements in the braille type cell module may be housed in the module.

The displacing movement of the free end portions of the piezo-electric actuating elements in the horizontal direction can be readily and efficiently converted to the vertical movement of the sensing rods by the pushing-up cams axially and pivotally supported on the support rods. Therefore, the piezo-electric actuating elements can be downsized. Since the force applied by the sensing rods can be converted to a force only in the displacing direction of the piezo-electric actuating elements by the pushing-up cams, no excessive force is applied to the piezo-electric actuating elements, thereby preventing damage to the piezo-electric actuating elements.

When a predetermined angle or predetermined curved surface, with respect to the horizontal direction, is formed on the mounting side plane of the second lever of each pushing-up cam, a required depression force can be applied to the corresponding sensing rod throughout each stroke.

When projections are formed at portions of the first levers of the pushing-up cams which are abutted against the free end portions of the piezo-electric actuating elements, abutment between the first levers and the free end portions of the piezo-electric actuating members can be made smoothly.

When a rotational moment is imparted to the pushing-up cams so that the side surfaces at the distal end portions of the first levers are always abutted against the free end portions of the piezo-electric actuating elements, the sensing rods will not be interfered within returning to the reset position in the reset state.

When the piezo-electric actuating elements of the sensing rods on one side, belonging to the adjacent sensing rods opposing each other, are provided below the sensing rods of the other side, the limited space is effectively utilized to obtain an optimum depression force.

When the cassette that integrally houses the pushing-up cams and the support rods supporting the pushing-up cams is detachably mounted on the frame body, assembly and maintenance of the tactile reading device are facilitated.

When the piezo-electric actuating elements are directly connected to the lead terminals provided to the housing and the housing is detachably mounted on the frame body, lead wires to be connected to the electrodes on the front and rear surfaces of the piezo-electric actuating elements become unnecessary, and assembly of the braille type cell module is facilitated.

When the control drive circuits are housed in the device, the piezo-electric actuating elements and the control drive circuits can be integrally formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is an exploded view showing a structure of a tactile reading device according to a first embodiment of the present invention;

FIG. 3 is an exploded view showing a final built up structure of the tactile reading device according to the first embodiment of the present invention;

FIG. 14 is an exploded view of a final step showing assembling a tactile reading device according to the fourth embodiment of the present invention.

DETAILED DESCRIPTION OF THE PREFERRED EMBODIMENTS

Figure 2:
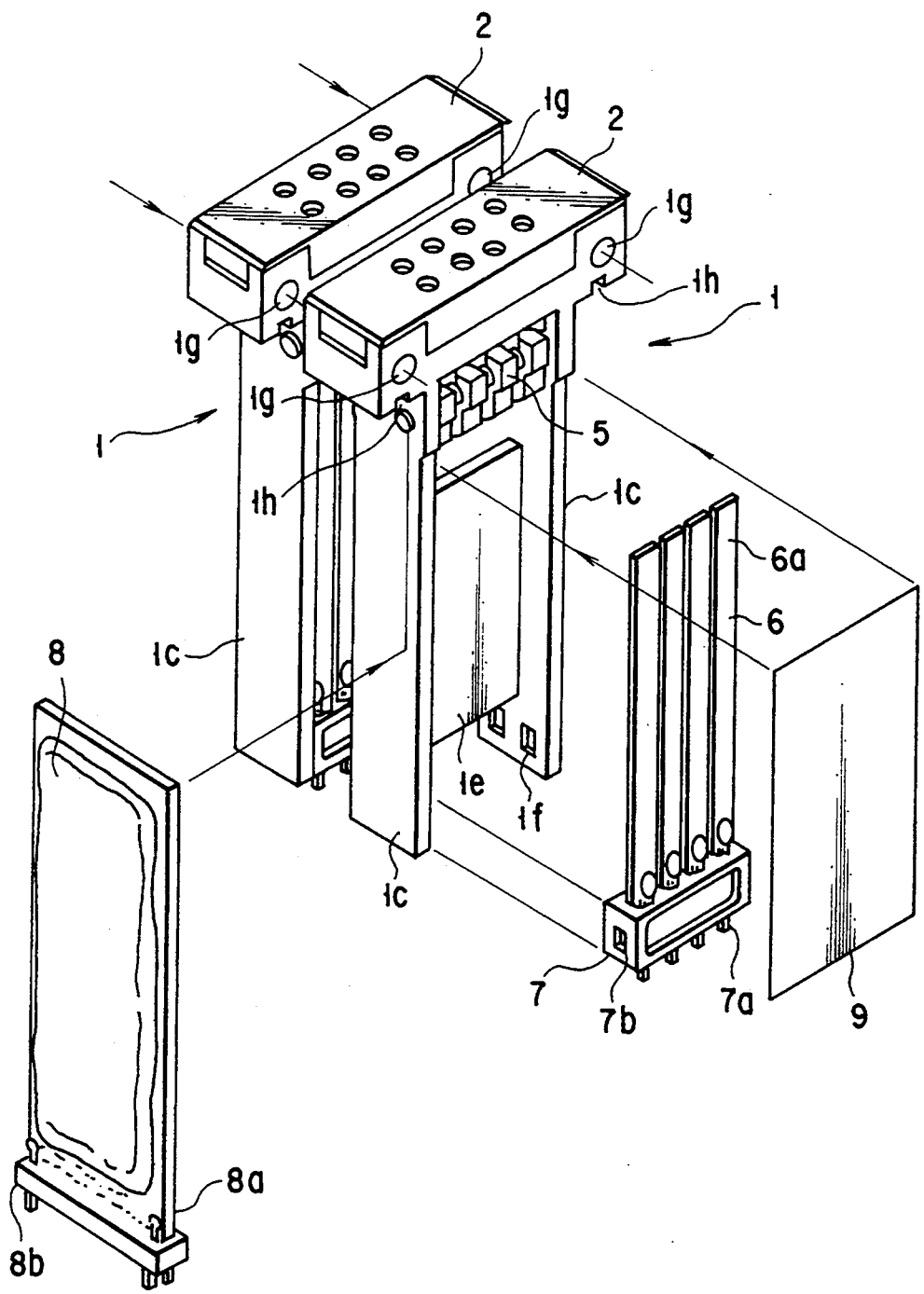
FIG. 2 is an exploded view of a main portion of the tactile reading device according to the first embodiment of the present invention.

The preferred embodiments of the present invention will be described with reference to the accompanying drawings. FIGS. 1 to 3 are views for describing the assembly method and the structure of a tactile reading device according to the first embodiment of the present invention. Referring to FIG. 1, reference numeral 1 denotes a frame body composed of a molded product of a synthetic resin or the like. Locking pawls 2a of a sensing plate 2 are engaged with recessed locking portions 1b of an upper body 1a of this frame body 1 to fix the sensing plate 2. A total of eight (=4×2 columns) sensing rods 3 for displaying a braille type character are held in the gap between the frame body 1 and the sensing plate 2 with their flanges 3a such that the sensing rods 3 will not be disengaged from the frame body 1 and the sensing plate 2 and that they are movable in the vertical direction within a predetermined stroke. The lower ends of the sensing rods 3 project downward from the upper body 1a.

Two holes 1d are formed in each of two side surfaces 1c provided to the right and left sides below the upper body 1a of the frame body 1, and the side surfaces 1c are divided into front and rear portions by a partition plate 1e. Two support rods 4 are provided to extend between the two side surfaces 1c to correspond to the columns of the sensing rod 3, and four pushing-up cams 5, each having first and second levers 5a and 5b to correspond to the two columns of the sensing rods 3, are axially supported on the support rods 4 to intersect the support rods 4 through their through holes 5c in a manner to be described later.

After the sensing plate 2, the support rods 4, and the pushing-up cams 5 are mounted on the corresponding frame bodies 1, two housings 7 are mounted between the two side surfaces 1c on the two sides of the partition plate 1e by utilizing recessed locking portions 1f and locking pawls 7b of the housings 7. As shown in FIG. 2, each housing 7 vertically holds four integrally formed bimorph piezo-electric actuating elements 6 such that their free end portions 6a are directed upward. At the same time, lead terminals 7a to be connected to electrodes on the front and rear surfaces of the piezo-electric actuating elements 6 extend vertically through the housings 7. Two frame bodies 1 on which the support rods 4, the pushing-up cams 5, and the housings 7 are mounted, are coupled to each other by coupling rods (not shown) through coupling holes 1g therein.

The control drive circuits 8 each mounted on a printed circuit board 8a are respectively attached to the right and left outer sides of the side surfaces 1c of the coupled frame bodies 1 by utilizing locking grooves 1h. Each control drive circuit 8 drives the eight piezo-electric actuating elements 6 mounted on one frame body 1 and has a connector 8b for receiving a control signal at its lower portion. Furthermore, for the purpose of protecting the piezo-electric actuating elements 6, an insulating film 9 is adhered between the side surfaces 1c by utilizing an adhesive or the like.

A semi-finished product, in which the two frame bodies 1 assembled in the above manner and including the housings 7 and the control drive circuits 8 are coupled, is soldered to the printed wiring of a bottom plate 10 provided with a connector 10a, as shown in FIG. 3, thereby completing a braille type cell module.

Figures 4, 5:
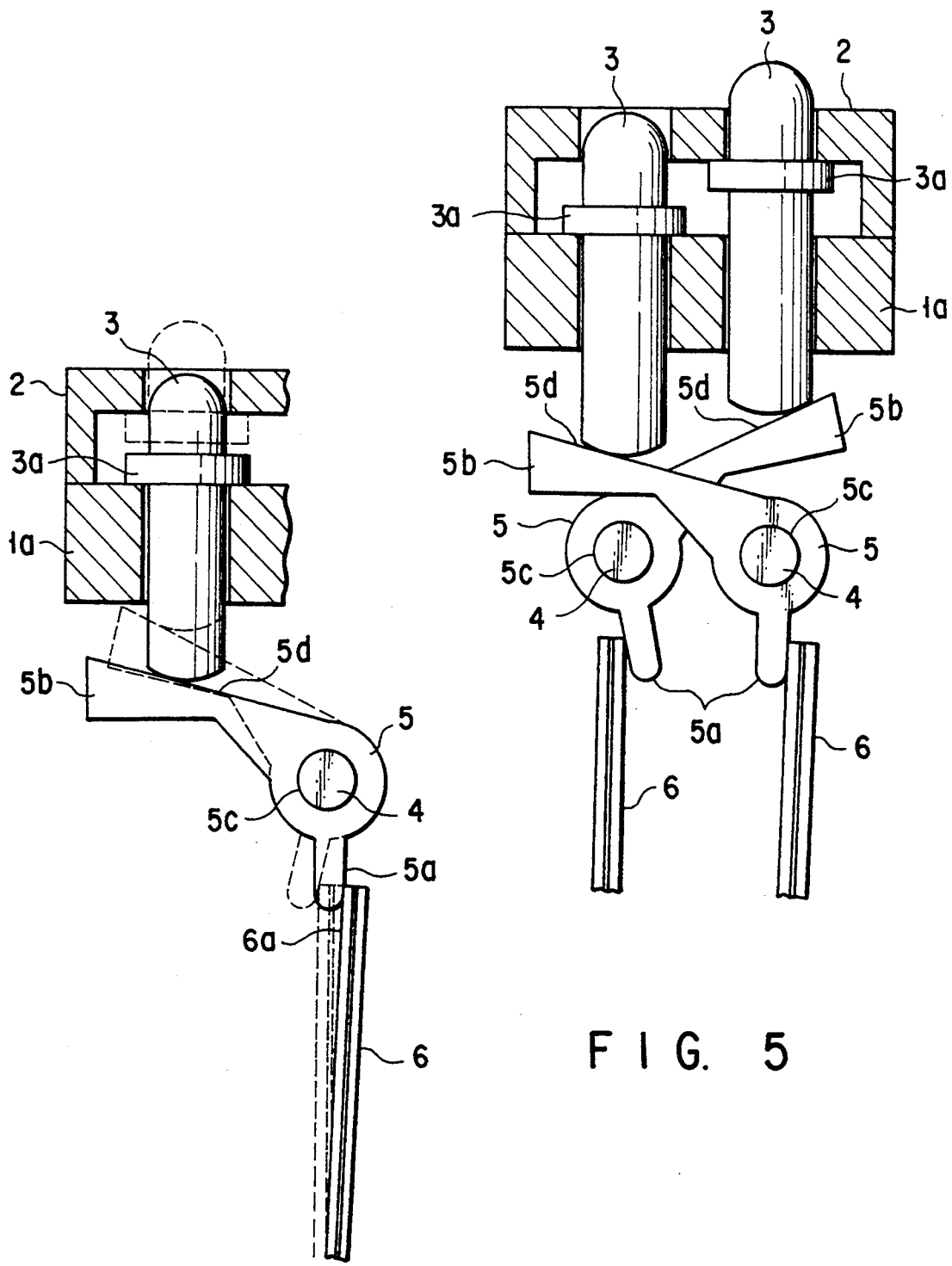
FIG. 4 is a sectional view showing an operational relation between a sensing rod, a pushing up cam and a piezo-electric actuating element.
FIG. 5 is a sectional view showing the sensing rods arranged in two rows and a disposing relation between the pushing-up cams and the piezo-electric actuating elements corresponding to the sensing rods.

The mutual relationship among the sensing rods 3, the pushing-up cams 5, and the piezo-electric actuating elements 6 of the braille type cell module of this embodiment packaged in the above manner will be described with reference to FIG. 4. As shown in FIG. 4, each pushing-up cam 5 is assembled such that the side surface at the distal end portion of its first lever 5a, extending downward from the support rod 4, is abutted against the free end portion 6a of the corresponding piezo-electric actuating element 6 and that the lower end portion of the corresponding sensing rod 3 is freely mounted on a mounting plane 5d at the distal end portion of its second lever 5b, extending laterally from the support rod 4. When the sensing rod 3 is in a reset state not displaying braille type information, the free end portion 6a of the corresponding piezo-electric actuating element 6 is displaced to the right in FIG. 4, as indicated by a solid line. In this state, the mounting plane 5d of the second lever 5b is set to form a predetermined angle with respect to the horizontal direction, as indicated by a solid line. In this reset state, the sensing rod 3, mounted on the mounting plane 5d, is in the reset state where it is lower than the sensing surface of the sensing plate 2.

When the piezo-electric actuating element 6 is driven to the set state, its free end portion 6a is displaced to the left in FIG. 4 to rotate the pushing-up cam 5 clockwise about the support rod 4 through the first lever 5a, as indicated by a broken line. This rotation pushes the sensing rod 3 mounted on the mounting plane 5d of the second lever 5b upward, and the sensing rod 3 projects upward from the sensing plate 2 to a position where its flange 3a is regulated by the lower surface of the sensing plate 2, thereby enabling a display state. When the piezo-electric actuating element 6 is driven to the reset state again, the free end portion 6a is displaced to the right to return the pushing-up cam 5 to the position indicated by the solid line, and the sensing rod 3 is moved downward by its own weight to a position where its flange 3a is regulated by the upper body 1a.

A localized rotational moment is given to the pushing-up cam 5 so that the side surface of the distal end portion of its first lever 5a is constantly abutted against the free end portion 6a of the piezo-electric actuating element 6 by the difference in rotational moment between the first lever 5a and the second lever 5b with respect to the support rod 4 regardless of the displacement position of the piezo-electric actuating element 6. Therefore, in the reset state wherein the piezo-electric actuating element 6 is displaced to the right, the second lever 5b is always at the lower position, so that it will not interfere with the downward return movement of the sensing rod 3 by its own weight.

The pushing-up cam 5 has a function of converting the vertical force applied by the sensing rod 3 to a force in the horizontal direction along which the piezo-electric actuating element 6 is displaced. Therefore, an excessive vertical force does not act on the piezo-electric actuating element 6, and the piezo-electric actuating element 6 is thus prevented from being damaged.

FIG. 5 shows a positional relationship among the sensing rods 3 arranged in two columns, the piezo-electric actuating elements 6 corresponding to the sensing rods 3, and the pushing-up cams 5 of this embodiment. As shown in FIG. 5, the piezo-electric actuating elements 6, corresponding to the sensing rods 3 of one of the two columns aligned in the direction to displace the free end portions 6a of the piezo-electric actuating elements 6, are arranged below the adjacent sensing rods 3 of the other column, and the piezo-electric actuating elements 6 corresponding to the sensing rods 3 of the other column are arranged below the adjacent sensing rods 3 of one column, so that the second levers 5b of the pushing-up cams 5 of the respective columns intersect each other. With this arrangement, the limited space between the sensing rods 3 and the piezo-electric actuating elements 6 is utilized efficiently, and an optimum depression force can be obtained.

Figure 6A:
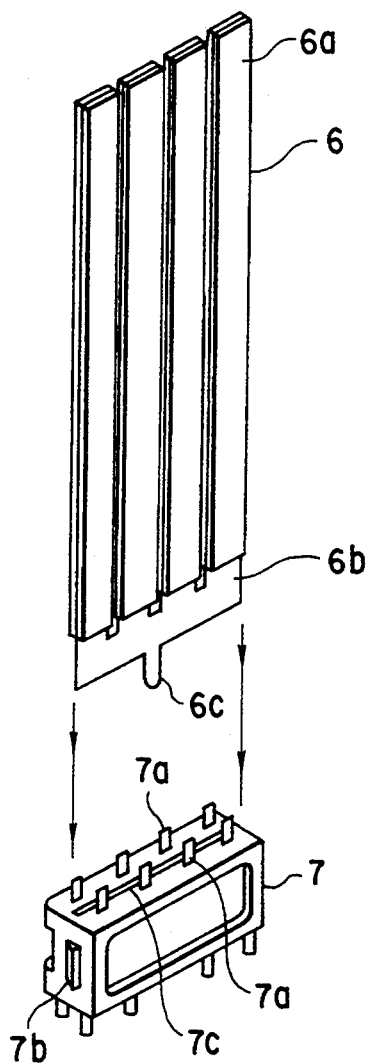
FIGS. 6A and 6B are a perspective diagram showing a structure of a housing.
Figure 6B:
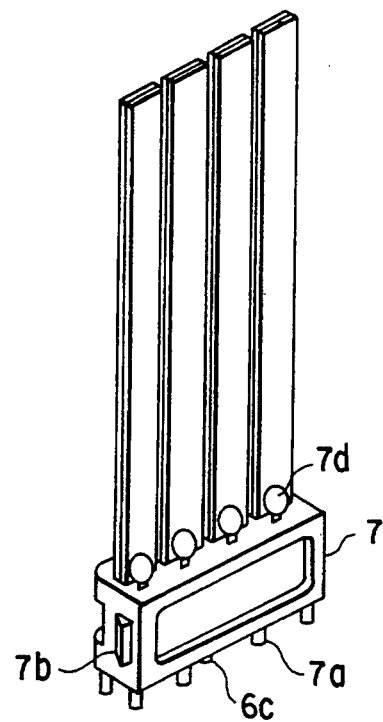

FIGS. 6A and 6B are perspective views for explaining the housing 7 of this embodiment. The housing 7 is a molded product made of an insulating synthetic resin or the like. As shown in FIG. 6A, four pairs of the lead terminals 7a corresponding to the electrodes on the front and rear surfaces of the four piezo-electric actuating elements 6, that is, the eight lead terminals 7a extend vertically through the housing 7. A groove 7c is formed at the central portion of the four pairs of lead terminals 7a for receiving an integral proximal end portion 6b of the four piezo-electric actuating elements 6. As shown in FIG. 6B, when the proximal end portion 6b is inserted in the groove 7c, a connection terminal 6c of a common electrode formed on the proximal end portion 6b projects downward from the housing 7. When the piezo-electric actuating elements 6 are inserted in the groove 7c, the electrodes on the front and rear surfaces at the proximal end portions 6b of the piezo-electric actuating elements 6 are directly connected to the corresponding pairs of lead terminals 7a through solder portions 7d and are thus fixed to the housing 7. The connection terminal 6c of the common electrode is connected and fixed to the bottom plate 10 together with the eight lead terminals 7a, as shown in FIG. 3. At the same time, the control drive circuits 8 are also connected to the bottom plate 10 through the connectors 8b.

Figure 7A:
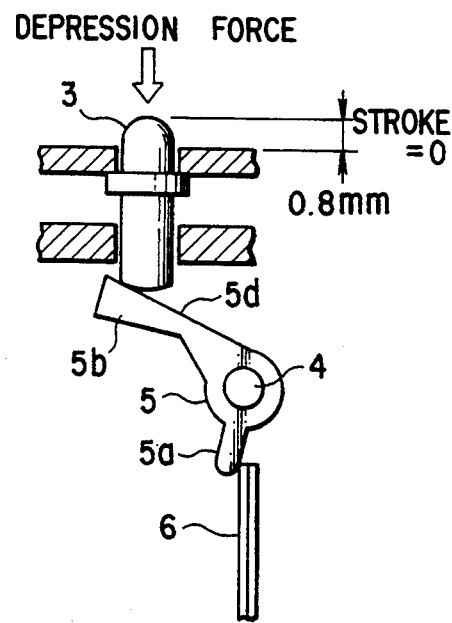
FIG. 7A is a sectional view for explaining the operational diagram shown in FIG. 7C.
Figure 7B:
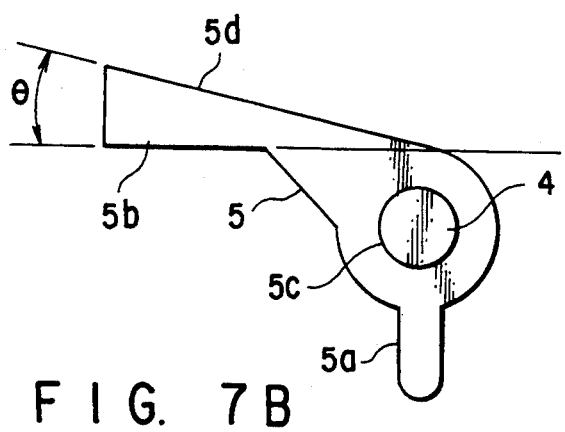
FIG. 7B is an enlarged sectional view shown in FIG. 7A.
Figure 7C:
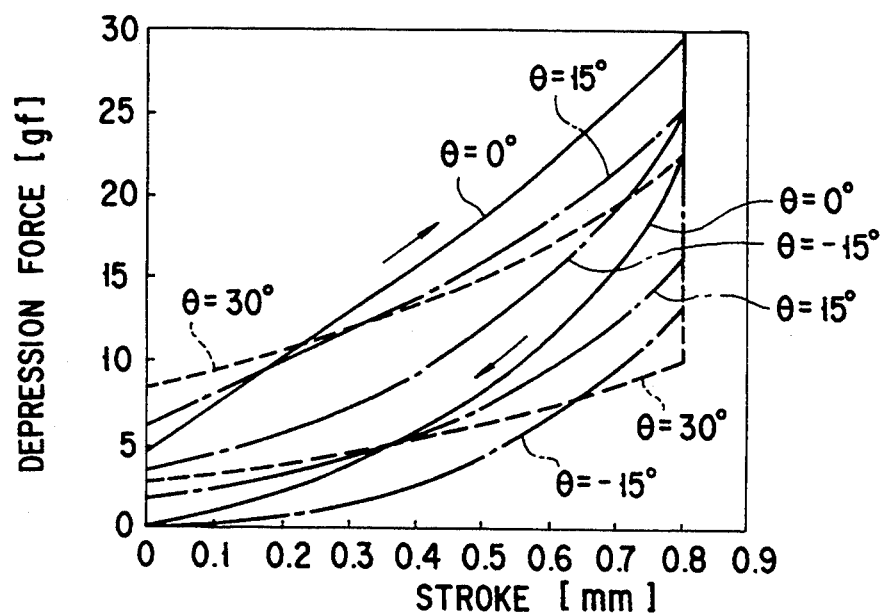
FIG. 7C is an operational diagram showing a relationship between a stroke and a pushing-up force of the sensing rod.

FIG. 7C shows the result of an experiment conducted for examining the relationship between the stroke and the depression force of the sensing rod 3 of the braille type cell module constituted in the manner as described above. An angle $\theta$, defined by the mounting plane 5d of the second lever 5b on which the sensing rod 3 is mounted, and the horizontal direction were determined as a parameter, and the experiment was conducted with $\theta = -15°, 0°, 15°$, and $30°$. The four cases of this experiment will be compared. In the case indicated by an alternate long and two short dashed lines for $\theta = -15°$, the depression force is smallest at a point where the stroke is 0 mm. In the case indicated by a solid line for $\theta = 0°$, the depression force is largest at a point where the stroke is 0.8 mm. In the case indicated by a broken line for $\theta = 30°$, the depression force is largest at a point where the stroke is 0 mm and smallest at a point where the stroke is 0.8 mm. In the case indicated by an alternate long and short dashed line for $\theta = 15°$, the depression force exhibits an intermediate value between $\theta = 0°$ and $\theta = 30°$. It is preferable that necessary depression forces are obtained for the respective strokes with appropriate differences among them. If the depression forces fall within the range of this experiment, they can be put into practical use.

In FIG. 7A a sectional view for explaining the operational diagram shown in FIG. 7C is illustrated, and in FIG. 7B an enlarged sectional view shown in FIG. 7A is illustrated, respectively.

Figure 8A:
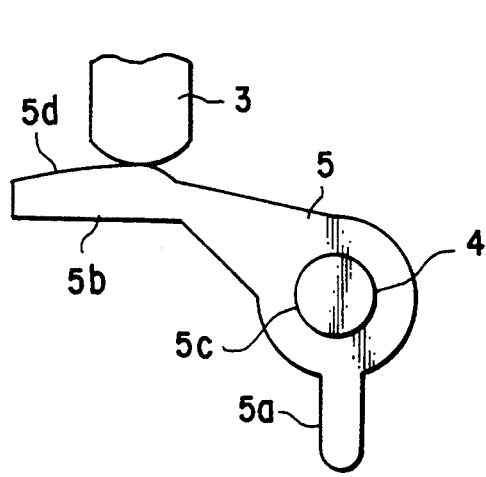
FIGS. 8A to 8C are sectional views showing an engaging relation between the sensing rod and the pushing-up cams having a curved portion formed on a mounting plane of a second lever.
Figure 8B:
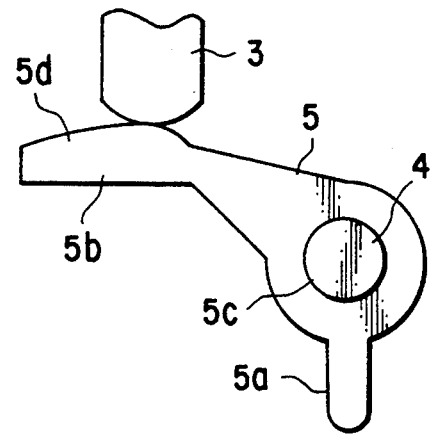
Figure 8C:
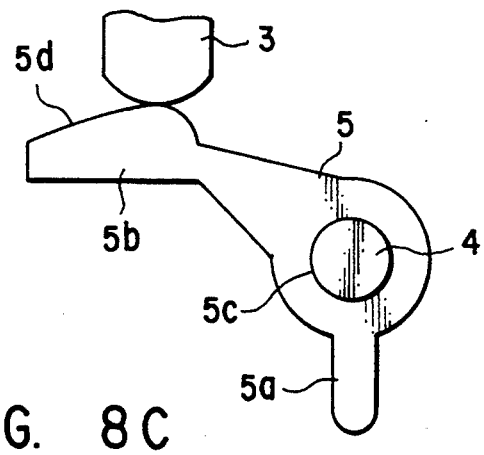

As shown in FIGS. 8A, 8B and 8C, when an appropriate curved surface is formed on the mounting plane 5d of the second lever 5b to extend from its distal end toward the support rod 4, the contact angle defined by the mounting plane 5d and the sensing rod 3 can be set at an optimum value for rotation of the pushing-up cam 5. Then, necessary depression forces can be maintained throughout the wide range of strokes with the appropriate differences among them.

Figure 9:
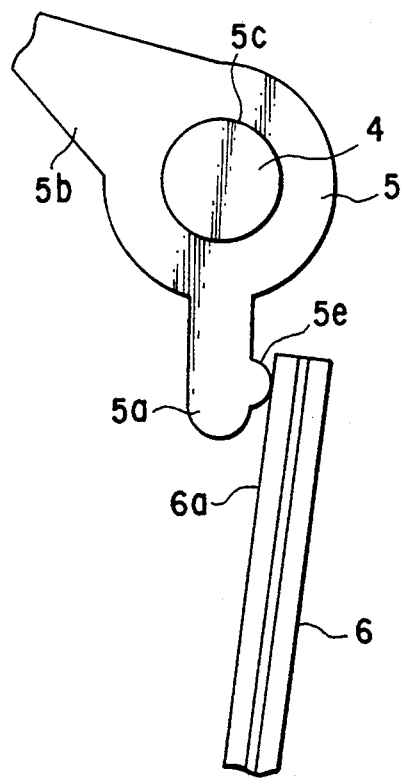
FIG. 9 is a sectional view showing an engaging relation between the piezo-electric actuating element and a projection formed in a side member of a first lever of the pushing-up cam.

In FIG. 9, a projection 5e is formed on a portion of the first lever 5a of the pushing-up cam 5 of this embodiment which is abutted against the piezo-electric actuating element 6. When the projection 5e is provided, contact between the first lever 5a and the piezo-electric actuating element 6 becomes smooth, and the displacing movement of the piezo-electric actuating element 6 can be efficiently converted to the vertical movement.

Figure 10:
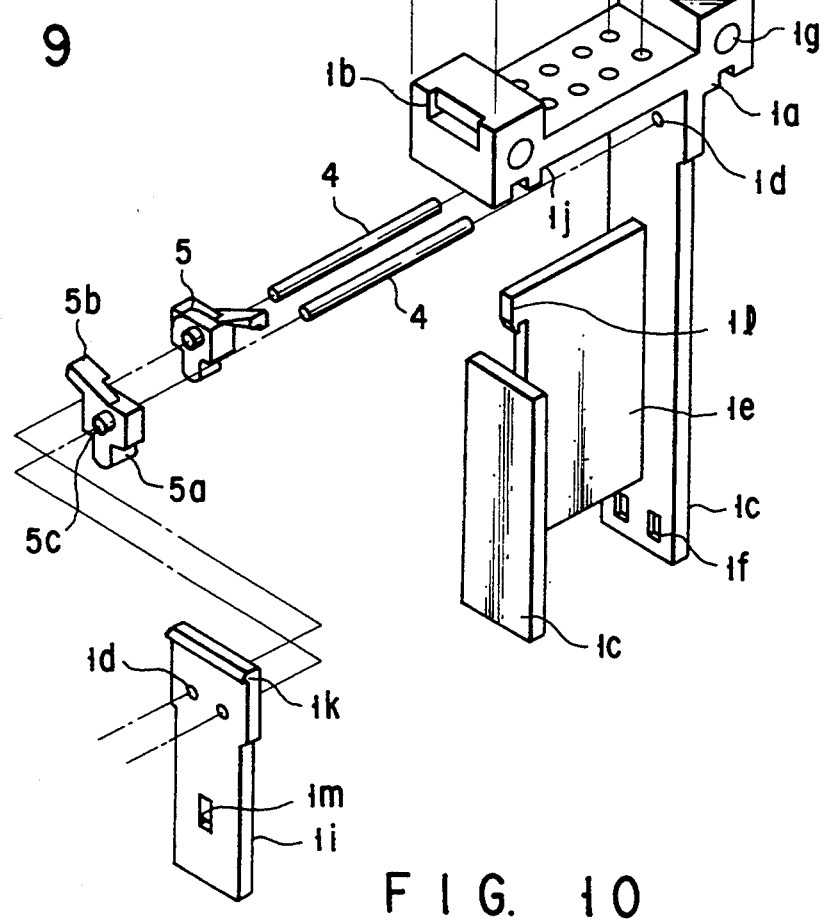
FIG. 10 is an exploded view showing a structure of a tactile reading device according to a second embodiment of the present invention.

FIG. 10 shows the second embodiment of the present invention wherein the structure of the frame body 1 of the first embodiment is partly modified. In this embodiment, the upper portion of one side surface 1c is constituted by an auxiliary side plate 1i which can be detached from an upper body 1a and a partition plate 1e. A locking pawl 1k to be engaged with a locking groove 1j of the upper body 1a and a locking hole 1m to be engaged with a locking pawl 1l of the partition plate 1e are formed in this auxiliary side plate 1i, and the auxiliary side plate 1i is fixed on the upper portion of one side surface 1c of the frame body 1 by these locking means. When support rods 4 and pushing-up cams 5 are to be built into the frame body 1, one end of each of the two support rods 4 is put in the corresponding one of two holes 1d in the other side surface 1c. Then, the pushing-up cams 5 are mounted on the two support rods 4 such that their second levers 5b intersect each other. Finally, the other end of each of the two support rods 4 is put in the corresponding one of the two holes 1d of the auxiliary side plate 1i, and the locking pawl 1k and the locking hole 1m are engaged with the locking groove 1j of the upper body 1a and the locking pawl 1l of the partition plate 1e, respectively, thereby fixing the auxiliary side plate 1i to the frame body 1.

Figure 11:
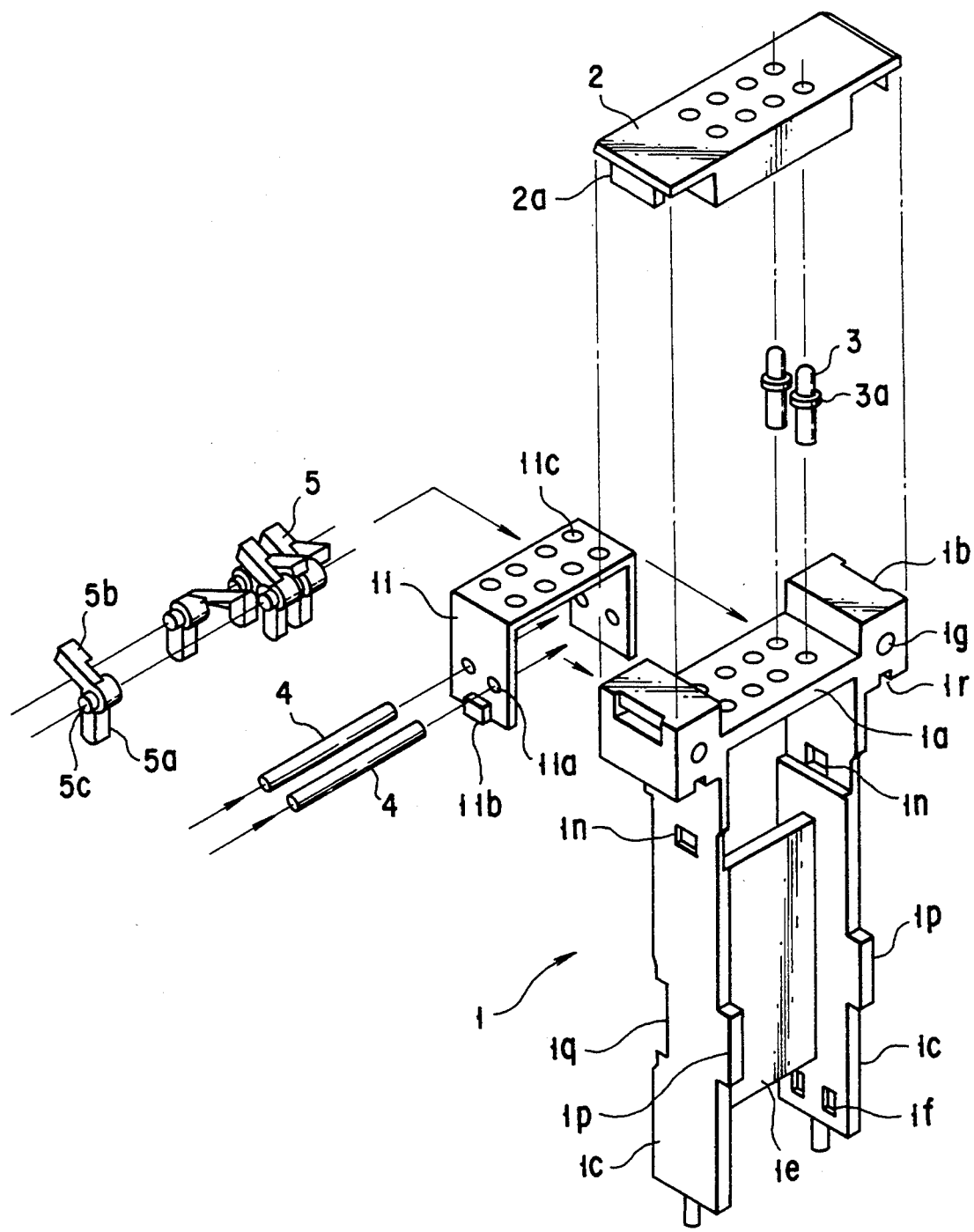
FIG. 11 is an exploded view showing a structure of a tactile reading device according to a third embodiment of the present invention.

FIG. 11 shows the third embodiment of the present invention wherein support rods 4 and pushing-up cams 5 are mounted on a cassette 11 in advance, and the cassette 11 is mounted on a frame body 1.

The U-shaped cassette 11 has the two side surfaces each of which has two holes 11a corresponding to the holes 1d in the side surface 1c of FIGS. 1 and 10 and a projection 11b to be locked in a locking hole 1n formed in each side surface 1c of the frame body 1. Holes 11c for allowing sensitive rods 3 to extend therethrough are formed in the upper surface of the cassette 11. The support rods 4 and the pushing-up cams 5 are mounted on this cassette 11 in the same manner as described in the first and second embodiments. Then, the cassette 11 is mounted on the frame body 1, and the projections 11b are engaged with the locking holes 1n, thereby fixing the cassette 11 to the frame body 1. According to this embodiment, since the support rods 4 and the pushing-up cams 5 are mounted on the cassette 11 in advance, assembly, maintenance, and replacement are facilitated.

In this embodiment, projecting portions 1p; for ensuring engagement with one adjacent frame body 1, and recessed portions 1q; to be engaged with the projecting portions 1p of the other adjacent frame body 1, are provided at the front and rear portions of the two side surfaces 1c of this frame body 1. These projecting portions 1p and the recessed portions 1q can be provided in the first and second embodiments as well.

Figure 12:
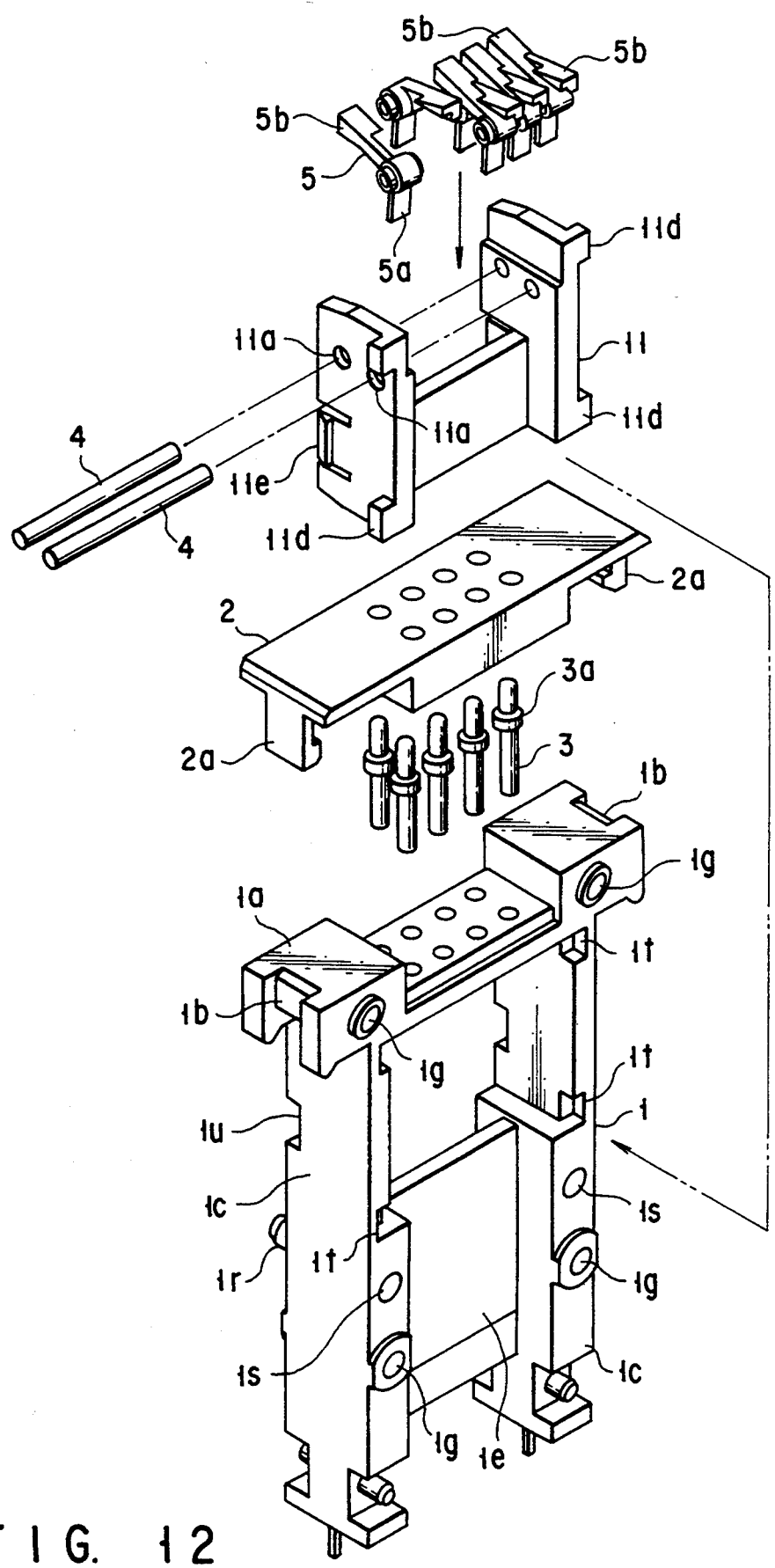
FIG. 12 is an exploded view of a first step showing assembling a tactile reading device according to a fourth embodiment of the present invention.
Figure 13:
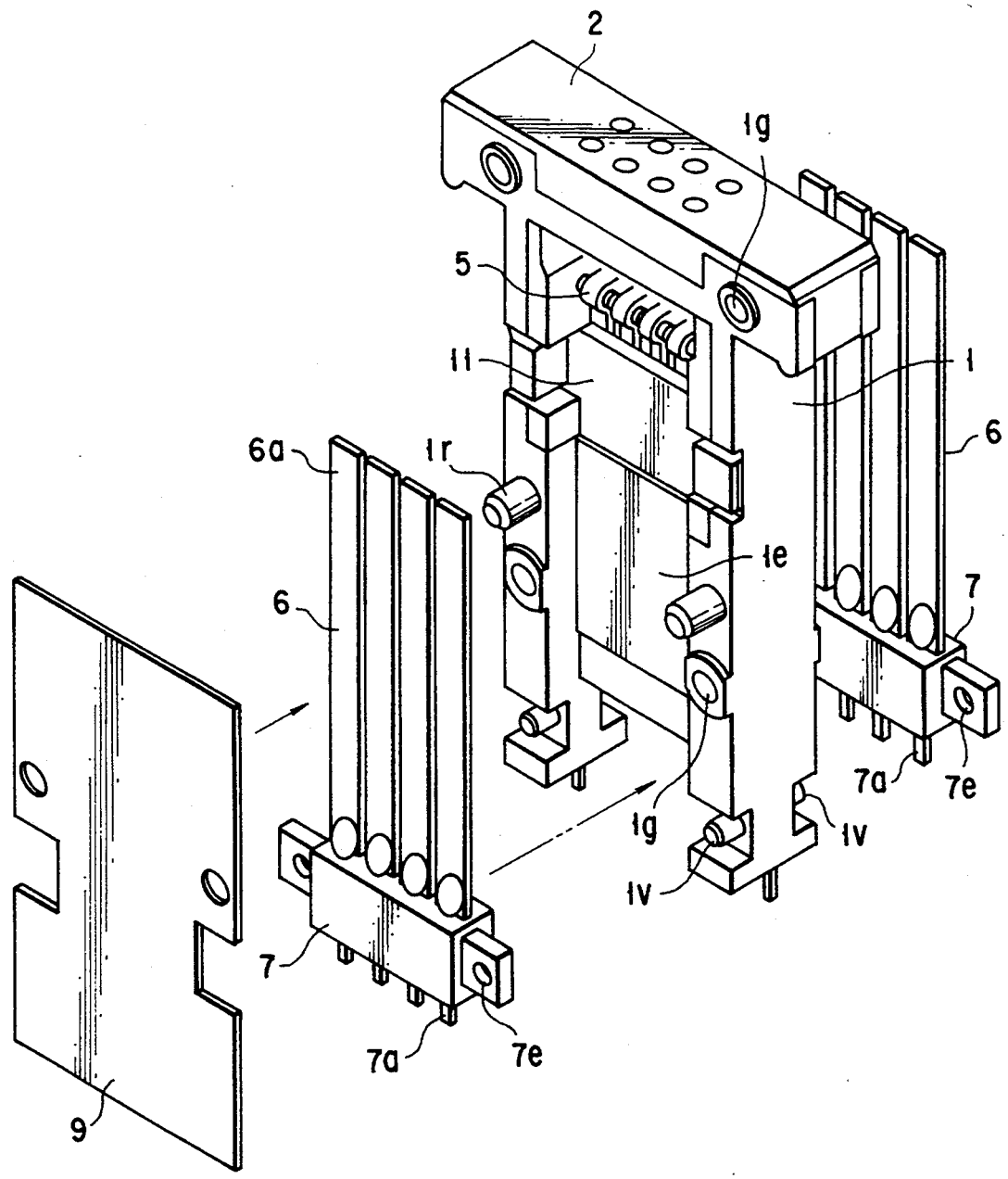
FIG. 13 is an exploded view of a second step showing assembling a tactile reading device according to the fourth embodiment of the present invention.

FIGS. 12 to 14 are perspective views for explaining the structure and assembling method of the fourth embodiment. In the fourth embodiment, the structure of a cassette 11 is different from that of the third embodiment, and the structure of a frame body 1 is obtained by partly modifying that of the first to third embodiments. In this embodiment, as shown in FIG. 12, the cassette 11 is formed by molding a synthetic resin into an H shape. Two holes 11a similar to those of the third embodiment are formed in each of the two side surfaces of the cassette 11. Also, two projections 11d, to be fit in two recessed locking portions 1t formed in two side surfaces 1c of a frame body 1, and locking pawls 11e, to be engaged with recessed locking portions 1u formed in the two side surfaces 1c of the frame body 1, are provided to the cassette 11. In this embodiment, support rods 4 and pushing-up cams 5 are mounted on the cassette 11 in advance in the same manner as in the third embodiment. Thereafter, the cassette 11 is mounted on the frame body 1 from the horizontal direction such that the projections 11d are fit in the recessed locking portions 1t and the locking pawls 11e are engaged with the recessed locking portions 1u, thereby fixing the cassette 11 on the frame body 1. In this embodiment, four coupling holes 1g are formed in each frame body 1 in order to reinforce coupling with adjacent frame bodies 1, and projections 1r for coupling the adjacent frame bodies 1 with each other and recessed portions 1s to be fitted in these projections 1r are provided. In this embodiment, as shown in FIG. 13, projections 1v are formed on the front and rear surfaces of each side surface 1c in order to mount two housings 7 on the frame body 1. Therefore, fitting holes 7e to be fitted on the projections 1v are formed in two sides of each housing 7. Finally, as shown in FIG. 14, the two frame bodies 1 including the corresponding housings 7 and two control drive circuits 8 are soldered to a bottom plate 10 together with a connector 10a, thereby completing assembly. According to this embodiment, since the pushing-up cams 5 can be easily assembled in the cassette 11, assembly of the entire tactile reading device is facilitated, and strength after assembly can be increased.

The present invention is not limited to the embodiments described above, but can be modified without departing from the spirit and scope of the invention. For example, the structure and assembly method of the pushing-up cams 5 described in the first embodiment, and the structure and assembly method of the housing 7 of the piezo-electric actuating elements 6, the control drive circuits 8, the bottom plate 10, and the like can naturally be practiced in the second, third, and fourth embodiments.

The following effects can be obtained by the present invention.

The displacing movement of the piezo-electric actuating elements can be readily and efficiently converted to the vertical movement of the sensing rods by the pushing-up cams axially and pivotally supported on the support rods. Therefore, the piezo-electric actuating elements can be downsized.

When a predetermined angle or predetermined curved surface is formed on the upper side surface at the distal end of the second lever of each pushing-up cam, an optimum depression force can be applied to the sensing rod throughout strokes of a wide range.

When projections are formed at portions of the first levers of the pushing-up cams which are abutted against the free end portions of the piezo-electric actuating elements, contact between the first levers and the free end portions of the piezo-electric actuating members becomes smooth, and the displacement of the piezo-electric actuating elements can be efficiently converted to the vertical movement of the sensing rods.

When a rotational moment is imparted to the pushing-up cams so that the side surfaces at the distal end portions of the first levers are always abutted against the free end portions of the piezo-electric actuating elements, the sensing rods are reliably returned to the reset position in the reset state.

When the piezo-electric actuating elements of the sensing rods on one side are provided below the sensing rods of the other side, the limited space is effectively utilized to obtain an optimum depression force.

When the cassette that integrally houses the pushing-up cams and the support rods is detachably mounted on the frame body, assembly and maintenance of the braille type cell module are facilitated. When the piezo-electric actuating elements are directly connected to the lead terminals of the housing, and the housing is detachably mounted on the frame body, lead wires of the piezo-electric actuating elements become unnecessary, and assembly of the braille type cell module is facilitated.

When the control drive circuits are housed in the module, replacement and maintenance of the tactile reading device are facilitated, and the braille type system can be downsized.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A tactile reading device comprising:
   a frame body;
   a plurality of sensing rods, provided on an upper portion of a frame body and supported so as to be vertically movable, for serving as braille type display units;
   a plurality of piezo-electric actuating elements provided on a lower portion of said frame body to respectively correspond to said sensing rods and disposed vertically such that free end portions thereof extend in an upward direction;
   said frame body including a module having said sensing rods and said piezo-electric actuating elements mounted thereon;
   a plurality of pushing-up cams disposed between said sensing rods and said piezo-electric actuating elements to transmit tactile reading information from said piezo-electric actuating elements to said sensing rods;
   support rods for axially and pivotally supporting said pushing-up cams; and
   each of said pushing-up cams has first and second levers, said first lever extending downward from a respective said support rod and having a lower end portion which freely contacts with said free end portion of a respective said piezo-electric actuating element, and said second lever extending laterally to a lower portion of a respective said sensing rod and having an upper portion which freely contacts with a lower portion of said respective sensing rod, and said pushing-up cam rotates on said support rod to transmit a force applied to said lower portion of said first lever of said pushing-up cam from said piezo-electric actuating element to said lower portion of said sensing rod.

2. The device according to claim 1, wherein lower end portions of said first levers of said pushing-up cams which contact said free end portions of said piezo-electric elements are provided with projections.

3. The device according to claim 1, further comprising a cassette, detachably mounted on said frame body, for integrally housing a predetermined number of pushing-up cams and said support rods supporting said pushing-up cams.

4. The device according to claim 1, wherein said pushing-up cams are imparted with a rotational moment on said support rods so that said lower end portions of said first levers always contact said free end portions of said piezo-electric actuating elements.

5. The device according to claim 1, further comprising a housing, detachably mounted on said frame body, and having a plurality of lead terminals, for directly connecting electrodes on front and rear surfaces of an integral proximal end portion of a predetermined number of piezo-electric actuating elements to said lead terminals.

6. The device according to claim 1, wherein control drive circuits for said piezo-electric actuating elements are provided to be housed in said module.

7. A tactile reading device comprising:
a plurality of sensing rods arranged in first and second rows and supported so as to be vertically movable, for serving as braille type display unit:
a plurality of piezo-electric actuating elements arranged in said first and second rows and disposed vertically such that free end portions thereof extend in an upward direction;
a frame body including a module having said sensing rods and said piezo-electric actuating elements mounted thereon; and
a plurality of support rods arranged between said sensing rods and piezo-electric actuating elements in said first and second rows, respectively;
a plurality of pushing-up cams axially and pivotally supported by said support rods and disposed between said sensing rods and said piezo-electric actuating elements to transmit tactile reading information from said piezo-electric actuating elements to said sensing rods;
each of said pushing-up cams has first and second levers;
the first lever of each said pushing-up cam supported by a respective said support rod in the first row extending downward from said support rod to a respective said piezo-electric actuating element arranged in the first row to freely contact with said free end portion thereof, and the second lever thereof extending laterally to a lower portion of a respective said sensing rod arranged in the second row to freely contact with a lower portion of said sensing rod arranged in the second row; and
the first lever of each said pushing-up cam supported by a respective said support rod in the second row extending downward from said support rod to a respective said piezo-electric actuating element arranged in the second row to freely contact with said free end portion thereof, and the second lever thereof extending laterally to a lower portion of a respective said sensing rod arranged in the first row to freely contact with a lower portion of said sensing rod arranged in the first row.

8. A tactile reading device comprising:
a frame body;
a plurality of sensing rods, provided on an upper portion of a frame body and supported so as to be vertically movable, for serving as braille type display units;
a plurality of piezo-electric actuating elements provided on a lower portion of said frame body to respectively correspond to said sensing rods and disposed vertically such that free end portions thereof extend in an upward direction;
said frame body including a module having said sensing rods and said piezo-electric actuating elements mounted thereon;
a plurality of pushing-up cams disposed between said sensing rods and said piezo-electric actuating elements to transmit tactile reading information from said piezo-electric actuating elements to said sensing rods;
support rods for axially and pivotally supporting said pushing-up cams; and
each of said pushing-up cams has first and second levers, said first lever extending downward from a respective said support rod and having a lower end portion which freely contacts with said free end portion of a respective said piezo-electric actuating element, and said second lever extending laterally to a lower portion of a respective said sensing rod and having an upper portion which forms a predetermined angle with respect to a horizontal direction and freely contacts with a lower portion of said respective sensing rod, and said pushing-up cam rotates on said support rod to transmit a force applied to said lower portion of said first lever of said pushing-up cam from said piezo-electric actuating element to said lower portion of said sensing rod.

9. A tactile reading device comprising:
a frame body;
a plurality of sensing rods, provided on an upper portion of a frame body and supported so as to be vertically movable, for serving as braille type display units;
a plurality of piezo-electric actuating elements provided on a lower portion of said frame body to respectively correspond to said sensing rods and disposed vertically such that free end portions thereof extend in an upward direction;
said frame body including a module having said sensing rods and said piezo-electric actuating elements mounted thereon;
a plurality of pushing-up cams disposed between said sensing rods and said piezo-electric actuating elements to transmit tactile reading information from said piezo-electric actuating elements to said sensing rods;
support rods for axially and pivotally supporting said pushing-up cams; and
each of said pushing-up cams has first and second levers, said first lever extending downward from a respective said support rod and having a lower end portion which freely contacts with said free end portion of a respective said piezo-electric actuating element, and said second lever extending laterally to a lower portion of a respective said sensing rod and having an upper portion which forms a predetermined curved surfaces with respect to a horizontal direction and freely contacts with a lower portion of said respective sensing rod, and said pushing-up cam rotates on said support rod to transmit a force applied to said lower portion of said first lever of said pushing-up cam from said piezo-electric actuating element to said lower portion of said sensing rod.

* * * * *